United States Patent [19]

Yug

[11] Patent Number: 4,831,311
[45] Date of Patent: May 16, 1989

[54] HIGH VOLTAGE STABILIZING CIRCUIT FOR PREVENTION OF OVERHEATING

[75] Inventor: Geun J. Yug, Kyungsangbook, Rep. of Korea

[73] Assignee: Goldstar Co., Ltd., Seoul, Rep. of Korea

[21] Appl. No.: 140,094

[22] Filed: Dec. 31, 1987

[30] Foreign Application Priority Data

Dec. 31, 1986 [KR] Rep. of Korea .............. 22095/1986

[51] Int. Cl.$^4$ ............................................. H01J 29/70
[52] U.S. Cl. ..................................... 315/411; 315/408; 358/243
[58] Field of Search ................. 315/411, 408; 358/243

[56] References Cited

U.S. PATENT DOCUMENTS

| | | | |
|---|---|---|---|
| 4,536,684 | 8/1985 | Babcock | 315/411 |
| 4,604,556 | 8/1986 | Haferl | 315/411 |
| 4,645,989 | 2/1987 | Barnes | 315/411 |
| 4,673,984 | 6/1987 | Kikuchi | 315/411 |

Primary Examiner—Theodore M. Blum
Assistant Examiner—David Cain
Attorney, Agent, or Firm—Birch, Stewart, Kolasch & Birch

[57] ABSTRACT

A high voltage stabilization curcuit for a multi-frequency horizontal deflection circuit in a video monitor or receiver and having a plurality of supply voltages applied to the flyback transformer of the deflection circuit through the operation of a pair of series connected switching circuits whereby different amplitude power supply voltages are coupled to the primary winding of the flyback transformer depending upon the horizontal drive frequency being utilized. The high voltage output across the secondary winding of the flyback transformer is stabilized through a feedback circuit which senses the output across the secondary winding of the flyback transformer to increase the amplitude of the horizontal drive applied to the primary winding when the high voltage output across the secondary winding decreases by means of a boost circuit coupled to the horizontal output circuit coupled to the primary winding.

7 Claims, 2 Drawing Sheets

HIGH VOLTAGE STABILIZING CIRCUIT FOR PREVENTION OF OVERHEATING

The present invention relates to a high voltage stabilizing circuit for monitors receiving and operating at a plurality of different horizontal scanning frequencies, and in particular, to a high voltage stabilizing circuit designed to prevent overheating of the transistors in the high voltage stabilizing control section.

In the known prior art, when applying inputs of different horizontal scanning frequencies to a monitor, the transistor utilized for boost-up experiences wide swings in bias potentials tending to cause overheating in the transistor and thus lowering its reliablity. And any improvement with increased number of heat radiators has the disadvantage of increasing the size of the apparatus.

The present invention is designed to improve the above-stated disadvantages of the conventional art, and comprises a high voltage stabilizing circuit for the power supply voltages applied to the primary coil of a flyback transformer and is configured to change with variation of horizontal frequency to stabilize high voltage and resultingly enhance the high voltage stability under the frequency variation, as well as to reduce the bias difference of the boost-up transistor to prevent its overheating.

DETAILED DESCRIPTION OF THE INVENTION

Numerals 1, 7 indicate horizontal synchronizing signal terminals 2 and 8 indicating horizontal oscillating sections, 3 and 9 horizontal drive sections, 4 and 13 horizontal output sections, 5 and 14 boost-up circuits, 6 and 15 amplifiers, 10 a frequency change detector, 11 and 12 supply switching circuits, $B_1+-B_3+$ power supply potentials, $D_1-D_3$ diodes, $Q_1-Q_6$ transistors, $R_1-R_6$ resistors, and $FBT_1$ and $FBT_2$ indicate flyback transformers.

Figure 1:
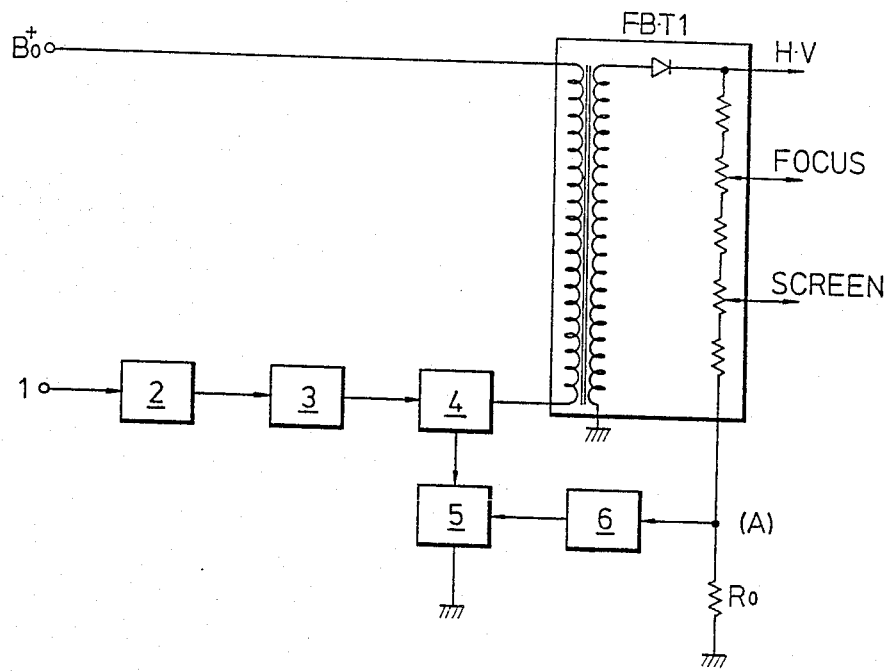
FIG. 1 shows the block diagram of a conventional high voltage stabilizing circuit.

Referring to FIG. 1, the conventional art shall be described as follows.

A horizontal synchronizing signal terminal (1) is connected to a horizontal oscillator (2), a horizontal drive (3) and a horizontal output (4) in that order. The output (4) connects to the primary coil of a flyback transformer ($FBT_1$) being connected to a power supply ($B_1+$) and also connects to a boost-up circuit (5). The secondary coil of the flyback transformer ($FBT_1$) connects via a diode to a high voltage terminal (H.V) and is grounded via the internal resistance and a resistor ($R_0$) and is connected with an amplifier (6) at a connecting point (A) of resistor $R_0$ to further connect to the boost-up circuit (5).

Describing the operation of the circuit in FIG. 1, the source ($B_0+$) supplies power to the primary coil of flyback transformer ($FBT_1$), and horizontal sync frequencies applied from horizontal synchronizing signal terminal (1) generate self-oscillation at horizontal oscillator (2) to be applied via horizontal drive (3) to horizontal output (4). Therefore, the secondary coil of the flyback transformer ($FBT_1$) provides a large amplitude voltage produced by ON-OFF operation of a horizontal output transistor in the horizontal output (4) to give the output of a constant high voltage to the high voltage terminal (H.V). Meanwhile, if a horizontal frequency higher than that of application to horizontal synchronizing signal terminal (1) is applied, the high voltage lowers to drop the voltage at point (A) so that amplifier (6) amplifies the voltage to further lower the bias of the transistor in boost-up (5). Accordingly, the collector pulse of the horizontal output transistor constituting horizontal output (4) becomes higher to stabilize the high voltage. Further, if a horizontal frequency higher than that of the above application is applied, the voltage at point (A) further drops for amplifier (6) and boost-up circuit (5) to further raise the collector voltage of the horizontal output transistor to apply to ($FBT_1$) for high voltage stabilization. However, a problem results in that the difference among horizontal frequencies applied to the horizontal synchronizing signal terminal causes a large bias difference of the boost-up transistor to result in overheating the boost-up transistor.

Figure 2:
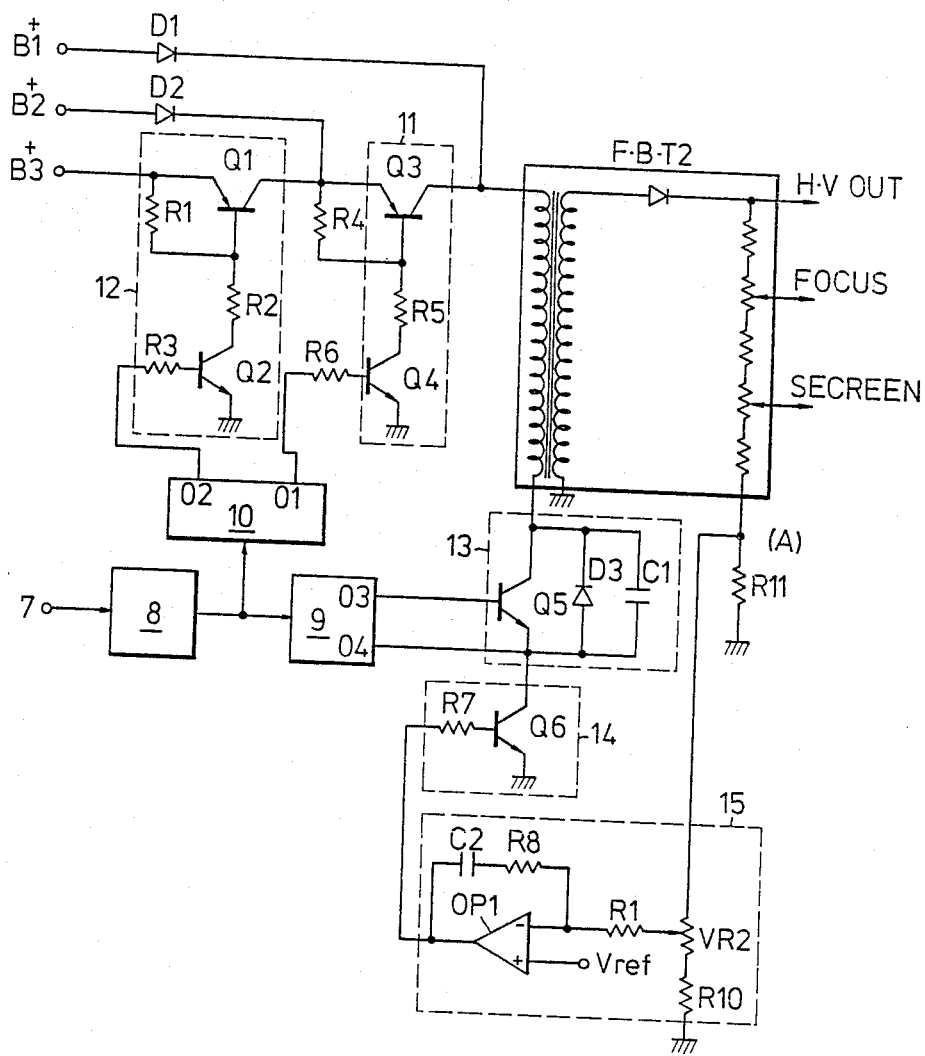
FIG. 2 illustrates the high voltage stabilizing circuit embodying the present invention.

Referring to FIG. 2, the composition of the circuit of the invention shall be described with improvements to overcome the above disadvantages. A horizontal synchronizing signal terminal (7) is connected, in order, to a horizontal oscillator (8), a horizontal drive (9) and a horizontal output (13), which also connects to the primary coil of flyback transformer ($FBT_2$) and to a boost-up circuit (14). The secondary coil of the flyback transformer ($FBT_2$) connects via a diode to a high voltage terminal (H.V) and is also grounded via the internal resistance and a resistor ($R_{11}$). An amplifier (15) is connected to a connecting point (A) of the above resistance to be further connected with a boost-up circuit (14). On the other hand, the output terminal of horizontal oscillator (8) is connected to a frequency change detector (10), of which output terminal ($0_1$) connects to a resistor ($R_6$) of a supply switching circuit (11) through which to further connect with the base of a transistor ($Q_4$) whose emitter is grounded, its collector connecting to a resistor ($R_5$) to further connect with a resistor ($R_4$) and with the base of a transistor ($Q_3$). And another output terminal ($0_2$) of the detector (10) connects to a resistor ($R_3$) of a switching circuit (12) to further connect with the base of a transistor ($Q_2$) whose emitter is grounded, its collector connecting to a resistor ($R_2$) to further connect with a bias resistor ($R_1$) and a transistor ($Q_1$). A power supply ($B_3+$) terminal connects to the emitter of a transistor ($A_1$), and a supply ($B_2+$) connects via a diode ($D_2$) to the collector of transistor ($Q_1$) and to the emitter of transistor ($Q_3$), while a supply ($B_1+$) connecting via a diode ($D_1$) to the emitter of transistor ($Q_3$) and to the primary coil of flyback transformer ($FBT_2$).

The operation of the invention as shown in FIG. 2 will now be described.

For reference in the invention, the plurality of horizontal sync frequencies shall be defined as AKHZ<BKHZ<CKHZ<DKHZ and the supply potentials as $B_1+(V)<B_2+(V)<B_3+(V)$. Upon applying AKHZ horizontal frequency to horizontal synchronizing signal terminal (7), horizontal oscillator (8) and horizontal drive (9) supplies horizontal bias pulse to the base of horizontal output transistor ($Q_5$) in horizontal output section (13), while the base of transistor (6) in boost-up circuit (14) maintains a constant voltage, such that the collector of transistor ($Q_5$) in the horizontal output (13) provides an output of a horizontal pulse. The output terminals ($Q_1$)($Q_2$) of frequency change detector (10) connected to the output terminal of the oscillator (8) provide voltages of a low state to turn off transistors ($Q_4$)($Q_2$) of respective supply switching circuits (11)(12) and also turn off transistors ($Q_3$)($Q_1$) by means of resistors ($R_4$)($R_1$). Therefore, the primary coil of flyback transformer ($FBT_2$) is applied with supply ($B_1+$) and the ON-OFF operation of transistor ($Q_5$) in horizontal output section (13) causes to output a constant high voltage to high voltage terminal (H.V).

However, if BKHZ horizontal frequency is applied to the signal terminal (7), the output terminal ($0_1$) of the detector (10) outputs high state voltage while the other output terminal ($Q_2$) outputs low state voltage, such that the transistors ($Q_4$)($Q_3$) in switching circuit (11) turn on and transistors ($Q_2$) ($Q_1$) in switching circuit (12) stay in the off state. Therefore, the drop of high voltage occurring due to the change of horizontal frequency from the low AKHZ frequency to the high BKHZ frequency is attenuated to apply the supply ($B_2+$) higher in voltage than the supply ($B_1+$) via transistor ($Q_3$) in conduction of the switching circuit (11) to the primary coil of flyback transformer ($FBT_2$), so that high voltage terminal (H.V) continuously produce output of a constant voltage.

On the other hand, if CKHZ horizontal frequency higher than that of BKHZ is applied to horizontal synchronizing signal terminal (7), the output terminals ($0_1$)($0_2$) of the detector (10) produce output of high state voltage to turn on transistors ($Q_4$)($Q_3$) and ($Q_2$)($Q_1$) of respective switching circuits (11)(12). As a result, the supply ($B_3+$) comes to apply via transistors ($Q_1$)($Q_3$) in conduction to flyback transformer ($FBT_2$) to cause the terminal (H.V) to produce output of a constant high voltage.

If, however, DKHZ horizontal frequency higher than CKHZ frequency is applied to the signal terminal (7) at this time, voltages at output terminals ($0_1$)($0_2$) of the detector (10) stay unchanged to keep driving supply switching circuits (11)(12) so that solely the supply ($B_3+$) applies to flyback transformer ($FBT_2$) lower voltage at the terminal (H.V).

Accordingly, the potential at point (A) simultaneously applied to the $\ominus$ input terminal of a differential amplifier ($OP_1$) in amplifier section (15) lowers and poduces an output of inverted amplified high voltage signal due to the reference voltage applied to the $\oplus$ input terminal. Consequently, the potential at the base of transistor ($Q_6$) in boost-up circuit (14) rises to increase its collector current, and the potential at the emitter of transistor ($Q_5$) in horizontal output section (13) changes to a low state to increase the maximum value (P—P) of collector voltage of the transistor ($Q_5$) and stabilize high voltage.

As described above, the present invention not only enhances the stability of high voltage under the variation of horizontal frequency but also actively and rapidly stabilizes high voltage even under a minor change of high voltage following the screen condition, such that irrespective of change in horizontal frequency or in brightness of picture reproduction the output of stabilized high voltage is continuously produced. Further, the bias change of the transistor is reduced to eliminate the overheating of the transistor for boost-up to an advantage.

I claim:

1. A high voltage stabilization circit for a multi-frequency deflection circuit in video display apparatus and having a plurality of supply voltages applied to the deflection circuit, comprising:

a flyback transformer having primary and secondary windings;

a first and second switching circuit coupled in series to one end of said primary winding and having respective input and output terminals;

means for coupling a first of said supply voltages directly to said one end of said primary winding of the flyback transformer, means for commonly coupling a second of said supply voltages to the output terminal and input terminal of said first and second switching circuits, respectively, and means for coupling a third of said supply voltages to the input terminal of said first switching circuit, whereby an open state of both said switch circuits apply the first supply to said primary winding, a closed state of the second switch circuit and an open state of the first switch circuit applies the first and second supply voltage to said primary winding, and closed state of both said switch circuits applies the first, second and third supply voltage to said primary winding;

means for supplying a selected frequency of a plurality of deflection frequencies to the other end of said primary winding;

frequency detector means coupled to said frequency supplying means and being operable to cause said first and second switching circuit to be in an open state for a first frequency, to cause said second switching circuit to be in a closed state and said first switching circuit to be in an open state for a second frequency, and to cause both said first and second switching circuits to be in closed state for a third frequency, means coupled to said secondary winding for sensing the output voltage there across and generating an output signal; and boost circuit means coupled to said supplying means and being responsive to a decrease in amplitude of said output signal due to an increase of deflection frequency from a predetermined value to provide an increase in signal amplitude to said primary winding and thereby stabilize the deflection circuit.

2. The circuit as defined by claim 1 wherein said first frequency is less than said second frequency and said second frequency is less than said third frequency.

3. The circuit as defined by claim 1 wherein the amplitude of the first of said supply voltages is less than the amplitude of the second of said supply voltages, and the amplitude of the second of said supply voltages is less than the amplitude of the third of said supply voltages.

4. The circuit as defined by claim 1 wherein the deflection circuit comprises a horizontal deflection circuit and said means for supplying a selected frequency to said primary winding of the flyback transformer comprises:

a horizontal oscillator circuit responsive to horizontal synchronizing signals of said plurality of frequencies;

a horizontal drive circuit coupled to said horizontal oscillator circuit; and a horizontal output circuit coupling the output of said horizontal drive circuit and said boost circuit means to the other end of said primary winding of the flyback transformer, 5. The circuit as defined by claim 4 wherein said first and second switching circuits are comprised of semiconductor switch circuits.

6. The circuit as defined by claim 4 wherein said means for sensing the output voltage across said secondary winding comprises a voltage divider coupled across said secondary winding and having a voltage tap, and
a difference amplifier having positive and negative input terminals and an output terminal, said voltage tap being connected to said negative input terminal, said positive input terminal being connected to a predetermined reference potential and said output terminal being connected to said boost circuit means.

7. The circuit as defined by claim 6 and wherein said boost circuit means includes a transistor whose conductivity is controlled by the output of said difference amplifier coupled to said horizontal output circuit.

* * * * *